United States Patent [19]

Hauschild et al.

[11] Patent Number: 4,786,917
[45] Date of Patent: Nov. 22, 1988

[54] SIGNAL PROCESSING FOR A THERMAL PRINTER

[75] Inventors: Edward A. Hauschild, Pittsford; David J. Howard, Hamlin, both of N.Y.

[73] Assignee: Eastman Kodak Company, Rochester, N.Y.

[21] Appl. No.: 56,925

[22] Filed: Jun. 3, 1987

[51] Int. Cl.[4] .............................................. G01D 15/10
[52] U.S. Cl. ................................. 346/76 PH; 400/120
[58] Field of Search ................ 346/1.1, 76 PH, 76 R; 400/120, 120 PH; 358/80

[56] References Cited

U.S. PATENT DOCUMENTS

| | | | |
|---|---|---|---|
| 4,346,402 | 8/1982 | Pugsley | 358/80 |
| 4,464,669 | 8/1984 | Sekiya et al. | 400/120 |
| 4,556,891 | 12/1985 | Matsushita et al. | 346/76 PH |
| 4,618,870 | 10/1986 | Inoue | 346/76 PH |
| 4,621,271 | 11/1986 | Brownstein | 346/76 PH |

Primary Examiner—H. Broome
Assistant Examiner—Huan H. Tran
Attorney, Agent, or Firm—Raymond L. Owens

[57] ABSTRACT

A signal processing for a color thermal printing apparatus first corrects contrast and color and then provides edge enhancement.

3 Claims, 5 Drawing Sheets

SIGNAL PROCESSING FOR A THERMAL PRINTER

BACKGROUND OF THE INVENTION

1. Field of the Invention

The present invention relates to signal processing for thermal printers.

2. Description of the Prior Art

Some thermal printer apparatus use a dye transfer process. In this process, a carrier containing a dye is disposed between a receiver, such as paper, and a print head formed of for example a plurality of individual thermal heat producing elements often referred to as heating elements. The receiver and carrier are generally moved relative to the print head which is fixed. When a particular heating element is energized, it is heated and causes dye to transfer (e.g. by sublimation) from the carrier to an image pixel in the receiver. The density, or darkness, or the printed dye is a function of the temperature of the heating element and the time the carrier is heated. In other words, the heat delivered from the heating element to the carrier causes dye to transfer to an image pixel of a receiver. The amount of dye is directly related to the amount of heat transferred to the carrier.

Thermal dye transfer printer apparatus offer the advantage of true "continuous tone" dye density transfer. By varying the heat applied by each heating element to the carrier, a variable dye density image pixel is formed in the receiver.

Continuous tone thermal printers are used to print color images. First a cyan image is printed and then magneta and yellow images are superimposed on the cyan image to form a colored image apparatus for making color images is shown in FIGS. 1-3 of this disclosure. Any order of printing can be used.

Many commercially available apparatus, produce color images in which the color pictorial information in such color images need to be enhanced. Signal processing algorithms are presently available but they are expensive and time consuming and tend to be quite complex.

SUMMARY OF THE INVENTION

It is an object of this invention to provide simple but effective signal processing for a thermal printer which provides enhanced continuous tone dye density images.

In accordance with the invention it has been found that by first correcting the digital dye density words of each image pixel to provide for contrast and color correction in accordance with transfer functions and then edge enhancing the corrected dye density words to provide significant improvement in the quality of the output continuous tone dye density color images. The transfer functions can be changed to provide image modification to the color or contrast of the output image in a receiver.

DESCRIPTION OF THE PREFERRED EMBODIMENT

Figure 1:
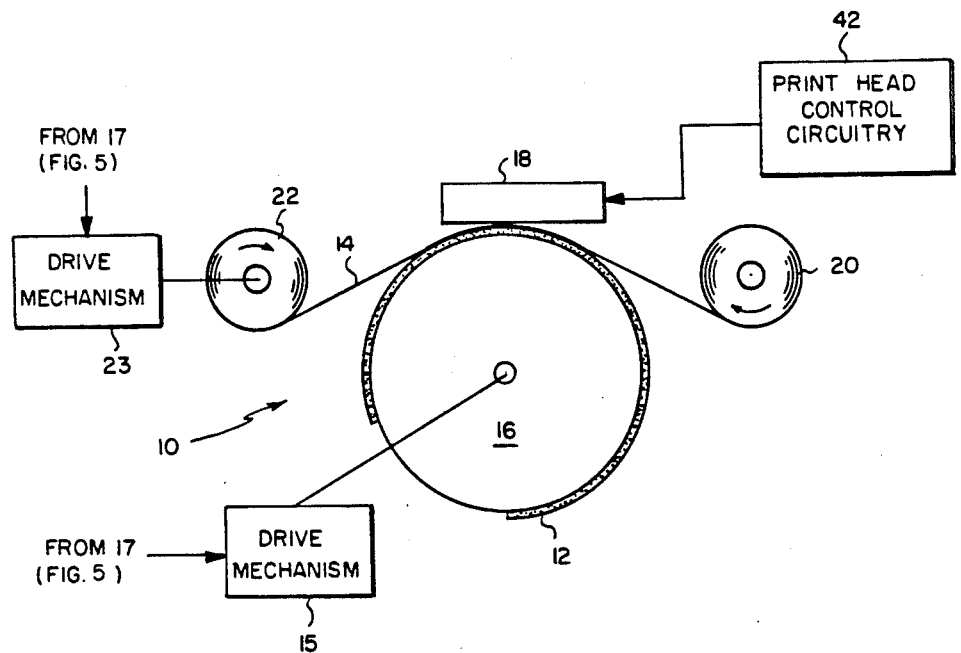
FIG. 1 is a schematic of a thermal printer apparatus which can be employed to make continuous tone dye images in accordance with the invention.

Referring now to FIG. 1, there is shown a thermal printer apparatus 10 which is adapted to print color images on a receiver member 12 from dyes transferred from a carrier member 14. The receiver member 12 is in the form of a sheet. It is secured to a rotatable drum 16 which is mechanically coupled to a drive mechanism 15. The drive mechanism 15 continuously advances the drum 16 and the receiver sheet 12 past a stationary thermal print head 18. The print head 18 has a plurality of heating elements (resistors) which are shown more clearly in FIG. 3. These heating elements press the carrier member 14 against the receiver sheet 12. The carrier member 14 is shown in the form of web and is driven from a supply roller 20 onto a take-up roller 22 by a drive mechanism 23 coupled to the take-up roller 22. The drive mechanisms 15 and 23, each include motors. These motors continuously advance the carrier and the receiver, respectively, relative to the heating elements of the print head 18. During printing, the heating elements are addressed and selectively energized as the carrier and receiver are continuously advanced. Accordingly, the resultant dye image pixel will be somewhat larger than if the carrier and receiver were stationary during dye transfer. The movement of the carrier is necessary to reduce sticking of the carrier to the heating elements in the print head 18.

Figure 2:
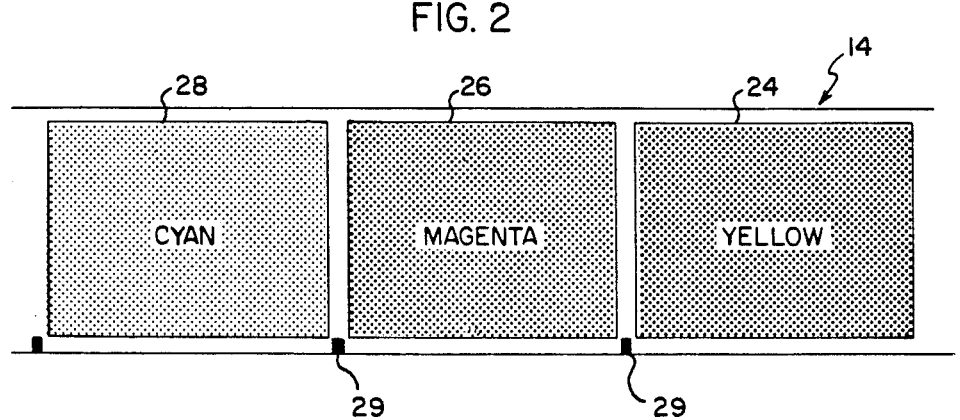
FIG. 2 is a top view of a carrier for use in the thermal printer apparatus of FIG. 1.

In FIG. 2 the carrier member 14 is shown in the form of a web with a repeating sequence of sections or frames of thermally transferable dye. Each frame in a sequence has a different color heat transferable dye. For example, each sequence of frames includes a frame of yellow thermally transferable dye 24, followed by a frame of magenta thermally transferable dye 26, followed by a frame of cyan thermally transferable dye 28. This sequence of yellow, magenta and cyan dye frames is of course repeated. Reference marks 29 are shown which can be used in the well known manner to control the operation of the drive mechanisms 15 and 23.

With reference to FIG. 1, the operation of the apparatus will be briefly described. Drive signals are continuously provided to the drive mechanism 15 from a microcomputer 17 (see FIG. 5) to rotate the drum 16 to bring successive areas of the receiver sheet 12 into the print region opposite print head 18. A portion of a dye frame of the carrier member 14 is disposed between the print head 18 and the receiver sheet 12. Both the receiver and the carrier members are moved relative to the print head during this printing operation.

Figure 5:
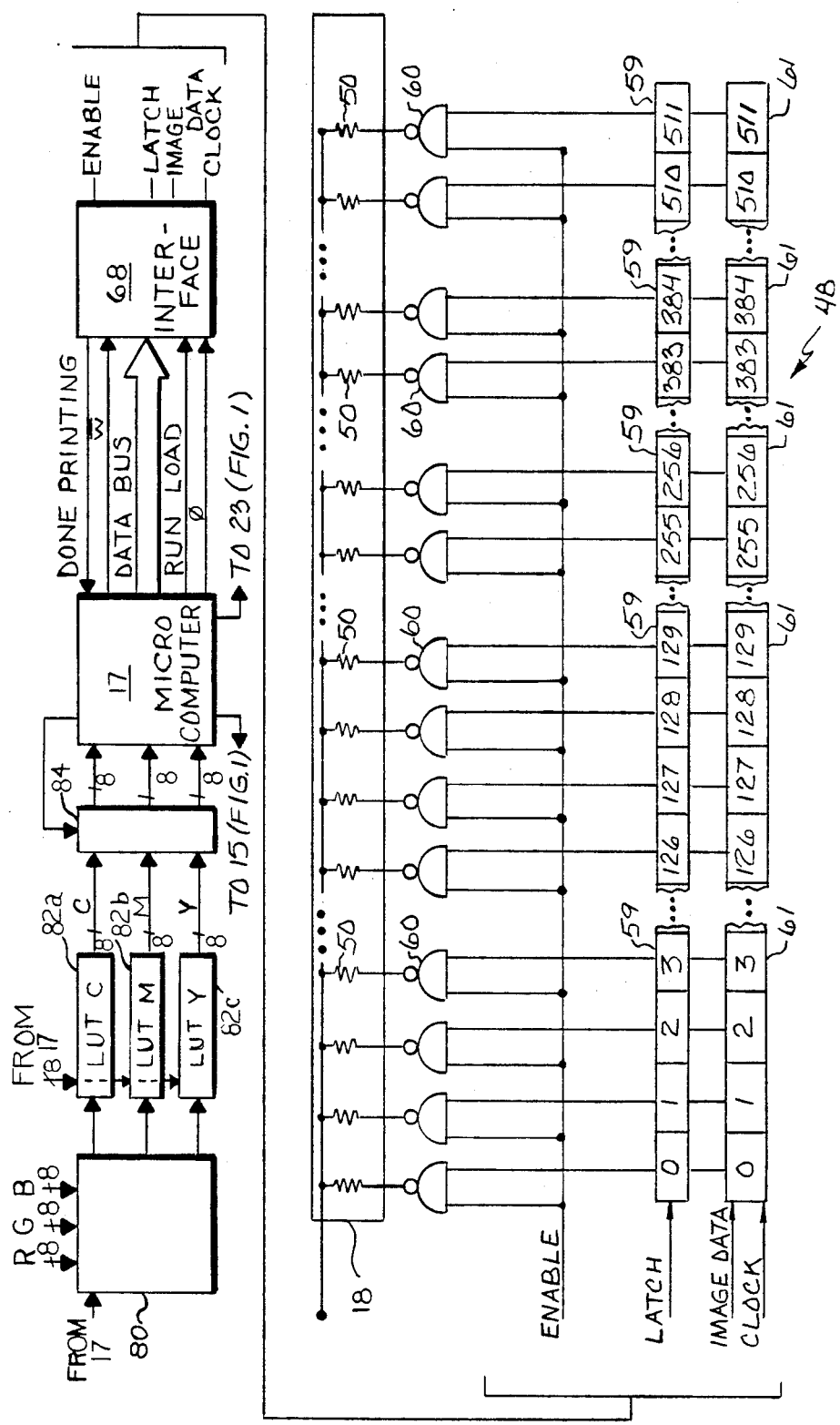
FIG. 5 is a schematic of the control circuit for signal processing and for operating the heating elements in the print head of the thermal printer apparatus of FIG. 1.

Turning briefly to FIG. 5, it is noted that the microcomputer 17 provides a write signal ($\overline{W}$), a clock signal φ, and data signals over a data bus to a control interface circuit 68. The data signals are 8 bit digital signals or words wich represent the dye density levels of image pixels. In response to signals provided by the control circuit 68, an enable signal supplied to each heating element of the print head 18 by circuitry 68 causing dye to transfer from the carrier to the receiver. A "done printing" line from circuit 68 tells the microcomputer 17 when a line of image pixels has been printed.

Turning again to FIG. 1, as the receiver member 12 moves through the print region, the selective energization of heating elements of a group results in the printing of a color image on the receiver. The process by which the heating elements are energized will be described later. The color of this image is determined by the color of the thermally transferable dye contained in each frame of the carrier member 14 that is being driven past the print region. After one complete color frame of an image has been printed, receiver 12 is returned to an initial, or home position. Carrier member 14 is advanced to move another color frame into position for printing, and print head 18 is selectively energized so as to print the next color frame of the image superimposed onto the previously printed image.

Figure 3:
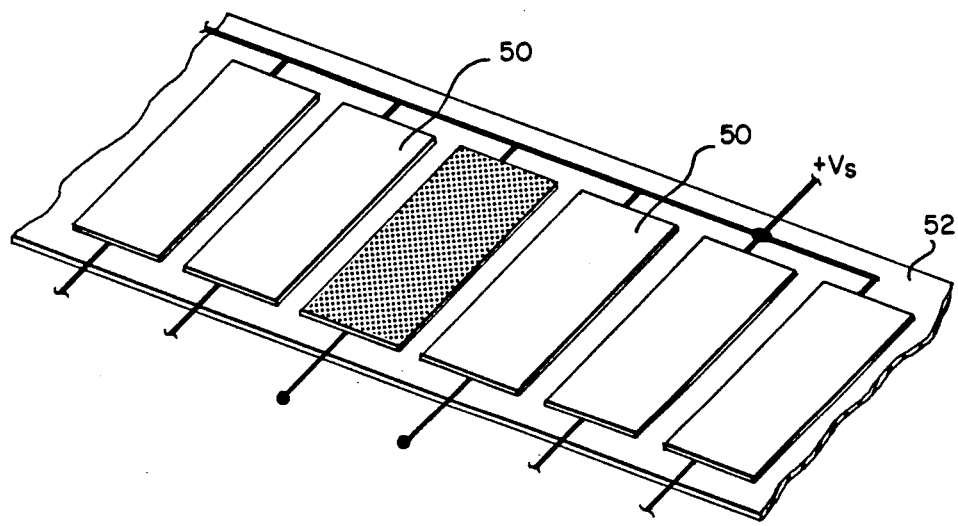
FIG. 3 is a perspective of several heating elements used in the print head of the thermal printing apparatus of FIG. 1.

FIG. 3 shows in schematic form several heating elements 50 of the print head 18. The heating elements 50 are arranged in a line. Each heating element 50 is made of a thin film of a resistive material, which is mounted on a non-conductive support 52. Although thin film heating elements are shown, it will be understood that thick film heating elements can also be used in accordance with the invention.

Figure 4:
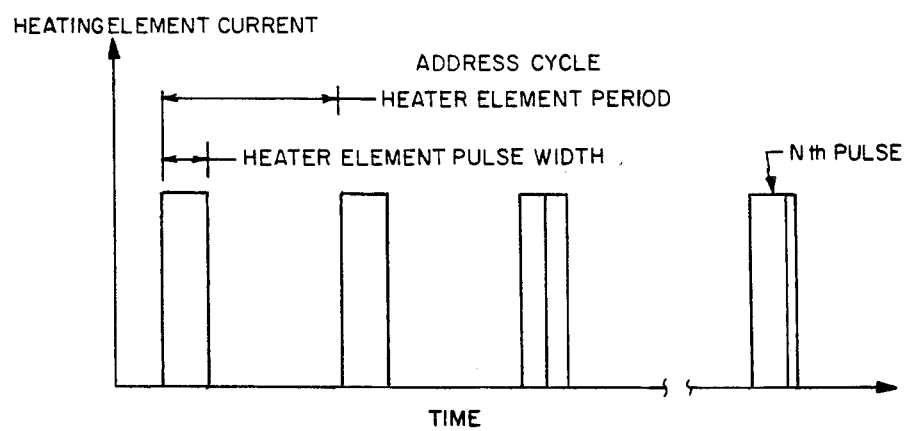
FIG. 4 illustrates the constant current pulses which are applied to a single heating element in accordance with the invention.

FIG. 4 shows adjustable constant current pulses applied to a single heating element 50 during an address cycle to form an image pixel. During an address cycle, an individual heating element is addressed by enable signals a predetermined number of times (N). This predetermined number N also represents the number of possible dye density levels. In other words, there are N possible current pulses in an address cycle for each heating element of a group. Each time a heating element is addressed, only a single current pulse can be applied to it. After all of the groups of heating elements have been addressed one time, the address process is repeated N-1 times for each group until the address cycle is completed. At this time, a line of image pixels having a particular color will have been printed.

As shown in FIG. 5, under the control of the signal from the signal from the microcomputer 17, red, green, and blue digital signals are applied to a frame store found in a logic block 80. The block 80 also will be understood to include logic which converts the red, green, and blue digital dye density words into cyan, magenta, and yellow digital dye density words in a manner are well understood to those skilled in the art. Cyan of course is a combination of green and blue, magneta is a combination of red and blue, and yellow is a combination of red and green. Since each dye density word includes 8 bits, it can represent a possible color (dye) density having 256 levels (the numbers 0–255). Under the control of timing signals from a microcomputer 17, cyan words are sequentially applied to a look up table (LUT) 82A. Similarly magneta words are sequentially applied to a look up table (LUT) 82B and then yellow words are sequentially applied to a look up table (LUT) 82C. The cyan words are processed first and after they are corrected by a LUT 82A are delivered to an input port 84. From the input port 84 the corrected dye density words are applied to the microcomputer 17. The microcomputer 17 includes an edge enhancement algorithm which operates upon corrected digital words to provide enhanced dye density digital words.

Figure 6B:
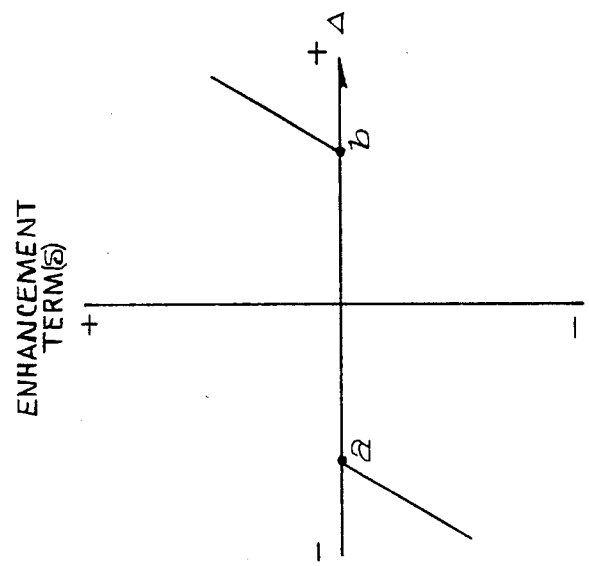
FIG. 6B graphically illustrates the operation of the edge enhancement algorithm.
Figure 6A:
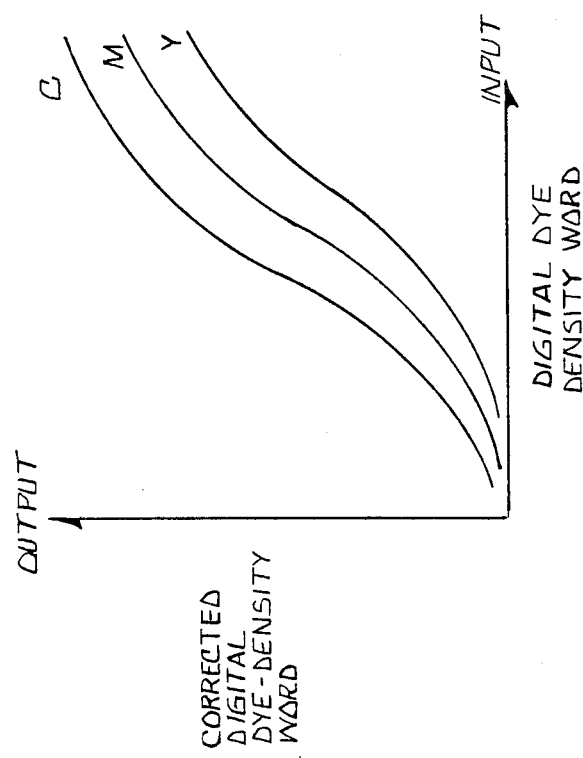
FIG. 6A graphically illustrates the operation of the look up tables (LUTS) shown in FIG. 5.

FIG. 6A illustrates the operation of the look up tables 82A, 82B, and 82C respectively. The X axis of FIG. 6A represents the input signal as it is applied to the input of a LUT and the Y axis represents the output from the LUT. The output of each LUT is a color and contrast corrected digital word. The transfer function represented by each curve can be determined experimentally to improve color and contrast.

The operation of the edge enhancement algorithm will now be described. Turning first to FIG. 6B we see a graphical representation of the operation of the algorithm. If we assume that the microcomputer 17 sets up two buffers in memory, a past pixel buffer which holds a line of corrected dye density digital words for the previous line which was printed and an output pixel buffer which holds the present line of corrected dye density digital words to be printed and to be edge enhanced. The difference (Δ) take on an individual pixel word between the corresponding numbers or values of each present corrected dye density word and each previous corrected dye density word is computed. Based upon this difference (Δ), the enhancement term (δ) is added to each word in the output pixel buffer to provide for edge enhancement. There will be an enhancement term which will have a value other than zero only if Δ is > b or < a.

A wide range of image modifications to color contrast can be achieved by changing the transfer functions in the look up tables. Look up tables which have been found to be useful are listed below. For a discussion of colorimetry see chapters 3 and 12 respectively, *Digital Image Processing*, Pratt (1978).

1. Adding or subtracting a constant value from one or two LUTS while keeping the remaining tables constant. This affects color balance. For example, adding a constant to all values in LUT 82C (yellow) effects yellow color balance.

2. A change in slope changes picture contrast. Non-Linear changes (a change in part of the curve) can control contrast selectively. For example, it can change only the highlights or shadows.

3. Changing the sign of the slope provides a negative image.

4. Doubling the slope (providing the printer can supply the necessary density) allows printing of transparencies.

5. A two level transfer function (a step function) is useful with high contrast images, text for example.

6. Gross distortions of the tables can be used for special effects similar to photographic posterization.

In accordance with the invention a plurality of transfer functions for different color and contrast can be permanently stored in memory of the microcomputer 17. Upon demand by an operator, they can be tansferred into the LUTS 82a, 82b, and 82c to change the color and contrast to modify the output color image in the receiver to achieve a desired result.

Figure 7:
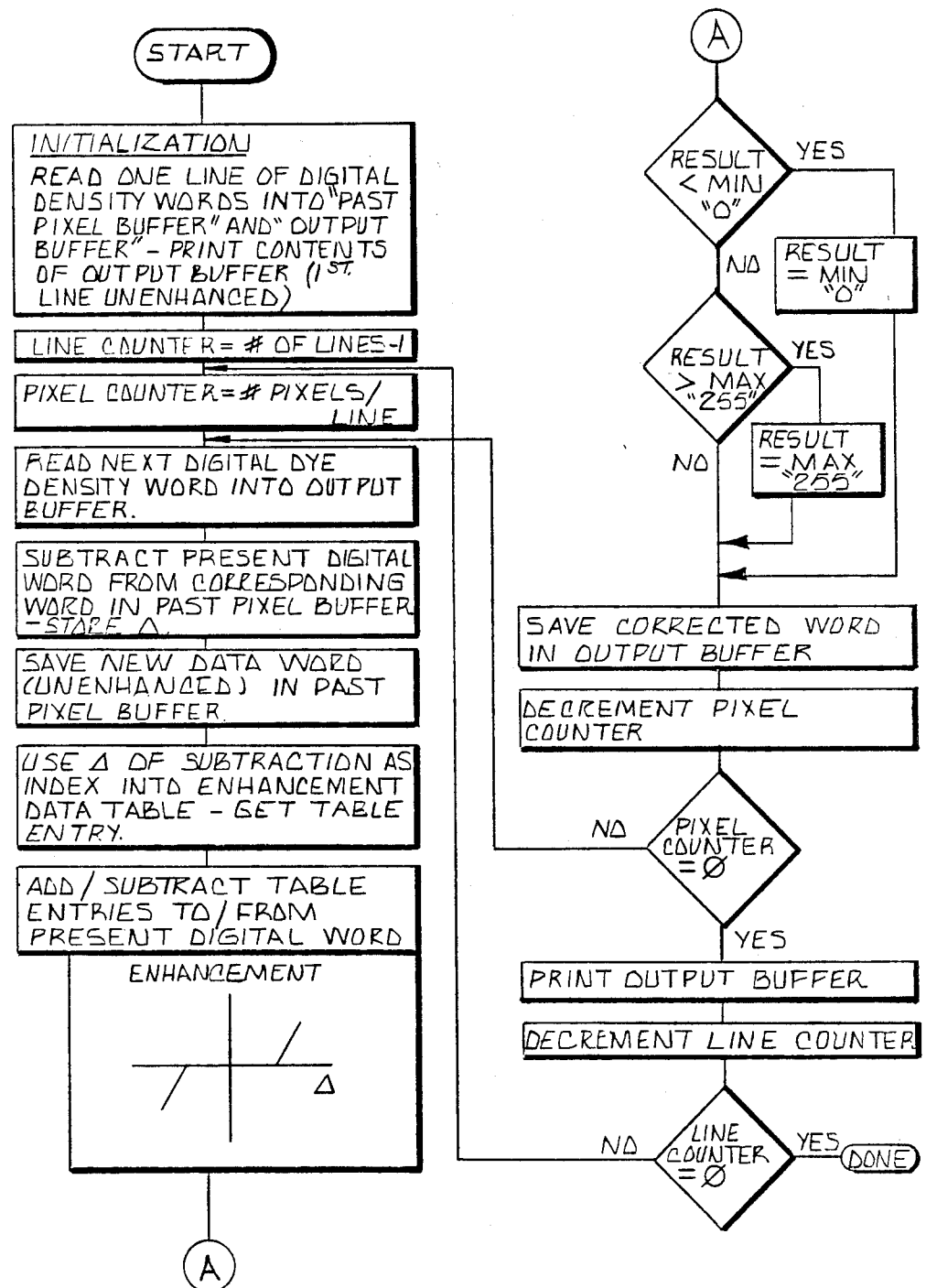
FIG. 7 is a flow chart of the edge enhancement algorithm.

Turning now to FIG. 7 we see a flow chart of the edge enhancement algorithm. In the initialization step, a line of corrected digital dye density words for a particular color is read from a LUT into the past pixel buffer. The same line is also read into the output buffer. The contents of the output buffer is printed without any correction or enhancement. In this example there are 512 heating elements and we will assume that there will be 512 lines so that an output image will have 512×512 pixels. Only one line (the first printed) will not be edge enhanced. In certain applications this line may not be printed. A line counter is set at the number 511. A pixel counter is also set at the number 512. Next, the first corrected digital dye density word of the second line is read into the output buffer. It is then subtracted from the corresponding word in the past pixel buffer. The first corrected data word is then transferred into its corresponding location in the past pixel buffer. The subtraction quantity ($\Delta$) is now used as an index into an enhancement data entry table which is used to determined the enhancement terms to be added or subtracted from the present corrected digital words to produce an enhanced digital dye density word. If in performing this process the value of the enhanced digital dye density word is less than zero, then the value is, of course, held at a minimum of zero and if the value is greater the maximum density of 255 then the value is held at a maximum of 255. The enhanced word is then stored in the output buffer and the pixel counter is decremented. If the pixel counter is not equal to the number 0, then the flow loops back to the position where the next digital dye density word is read into the output buffer. If it is at number zero, then the output buffer is printed (a line) and the line counter is decremented. If the line counted is not at zero, then again the flow chart is directed back to read the first corrected digital dye density word of the next line into the output buffer. If the line counter is at zero, then the particular color (cyan, magenta, or yellow) image is completed.

Control circuit 68 under the control of the microcomputer 17 provides clock signals to a shift register 61. For the sake of example, we will assume there are 512 heating elements in print head 18. The clock signal clocks in image data from the control circuit 68 into the shift register 61 until all of its 512 stages either contain a high (1) or a low (0) signal level or state. A latch signal provided by the control circuitry 68 causes data in each stage of the shift register 61 to be entered into a corresponding stage of a latch 59. A high enable signal held on the output of a latch is connected to a corresponding Nand gate 60. When a group enable signal is high, a circuit is completed through heating resistors 50 and the Nand gates 60 which have their corresponding latch stages in a high state. In other words, a heating element is energized. The pulse duration or pulses width is controlled by the time that the group enable signal is high. It will be understood that the Nand gates 60 can be organized into a plurality of groups, each group being generated by its own enable signal. This arrangement would reduce current drain on the power supply. All of the 512 heating elements 50 have been addressed one time (enabled)$_1$. They each may have been energized one time, depending on the state of their corresponding stages in latch 59. Now let us assume there are 256 possible dye density levels. In other words N=256. The shift register 61 will have to be loaded wtih data 256 different times. Each group of heating elements will be addressed 256 times to provide the 256 possible dye density levels.

We claim:

1. In a continuous tone color thermal apparatus including a printhead having a plurality of heating elements for printing a line at a time of image pixels, each heating element being selectively energized in response to a digital dye density word to apply heat to a carrier having dye to cause such dye to transfer to a receiver to form a dye image pixel of a line, each dye image pixel having a density which is a function of the value of its corresponding digital dye density word, the improvement comprising:

a. contrast and color correcting means responsive to each digital dye density word and transfer functions for producing corrected dye density words which are adjusted for contrast and color such correcting means including means for changing such transfer functions;

b. edge enhancing means for comparing each corrected dye density word in a line with its corresponding correcting dye density word in an adjacent line for adjusting the value of each corrected dye denstiy word to provide an edge enhanced dye density word, said edge enhancing means includes computer means programmed with an edge enhancement algorithm which computes the difference $\Delta$ between the value of a corrected dye density word to be printed and the previous coresponding corrected dye density word and in response to such difference $\Delta$ adjust the value of the corrected dye density word to be printed by an enhancement term $\delta$ to produce an enhanced dye density word where $\delta$ will have a negative value if $\Delta$ is less than a and a positive value if $\Delta$ is greater than b, where a and b are negative and positive values; and c. control means coupled to the printhead and responsive to each enhanced dye density word for selectively energizing the heating elements of the printhead to form a line of continuous tone dye image pixels.

2. The invention as said forth in claim 1, wherein the thermal printer sequentially prints superimposed cyan, magenta, and yellow dye images to form a color image and wherein said contrast and color correcting means include separate look up tables for the cyan, magneta, and yellow digital dye density words respectively.

3. The invention is said forth in claim 1, wherein said algorithm is illustrated in FIG. 6B.

* * * * *